Aug. 24, 1965  J. W. GILLOCK ETAL  3,202,791
METHOD OF BUTT WELDING
Filed Oct. 24, 1962  2 Sheets-Sheet 1
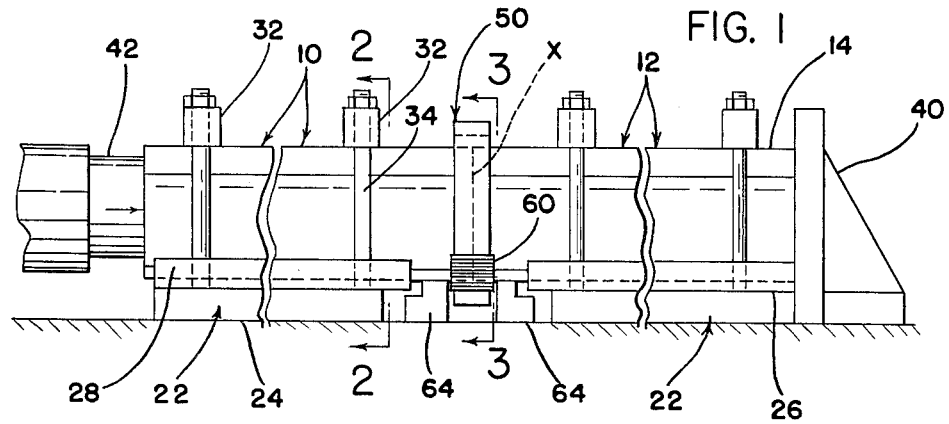
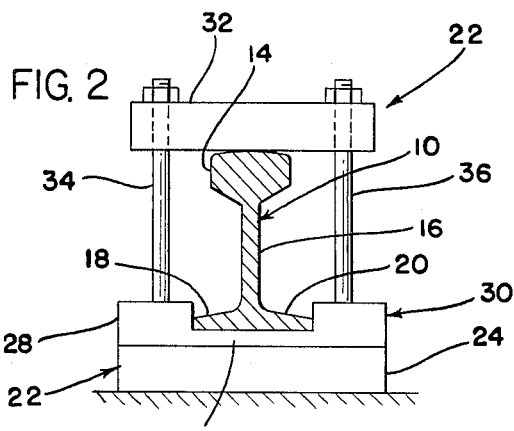
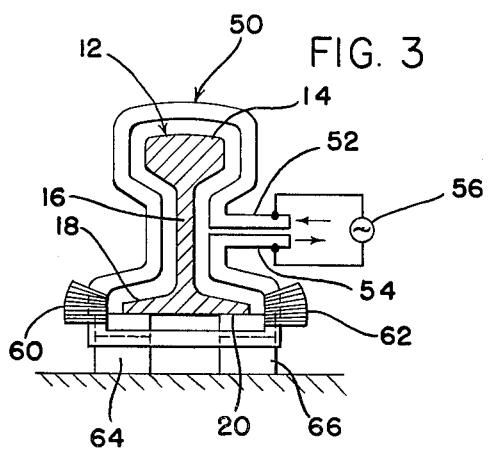
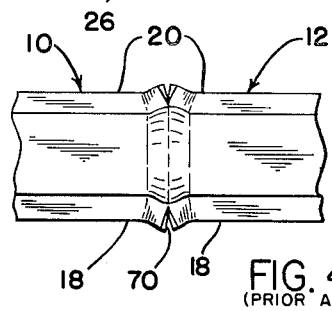
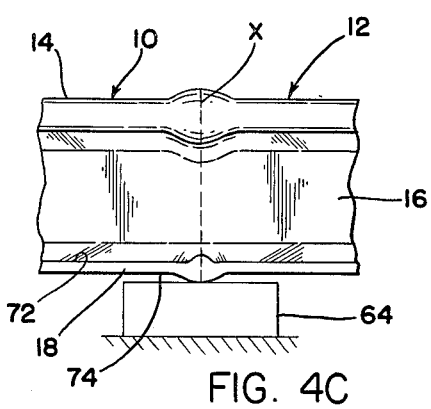
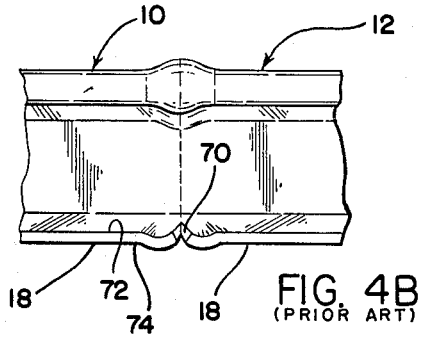
INVENTORS.
JACK W. GILLOCK,
GEORGE H. LEDL &
GEORGE M. MUCHA
BY Tilberry and Body
ATTORNEYS Aug. 24, 1965   J. W. GILLOCK ETAL   3,202,791
METHOD OF BUTT WELDING
Filed Oct. 24, 1962                                          2 Sheets-Sheet 2

INVENTORS.
JACK W. GILLOCK,
GEORGE H. LEDL &
GEORGE M. MUCHA
BY Tilberry and Body
ATTORNEYS

United States Patent Office 3,202,791
Patented Aug. 24, 1965

3,202,791
METHOD OF BUTT WELDING
Jack W. Gillock, Cleveland, George H. Ledl, South Russell, and George M. Mucha, Cleveland, Ohio, assignors to The Ohio Crankshaft Company, Cleveland, Ohio, a corporation of Ohio
Filed Oct. 24, 1962, Ser. No. 232,811
10 Claims. (Cl. 219—9.5)

The present invention pertains to the art of welding and more particularly to a method of butt welding two articles having substantially identical cross sections.

The present invention is particularly applicable to the art of butt welding sections of steel railway rails and will be discussed with particular reference thereto; however, it is to be appreciated that the invention has broader applications and may be used for butt welding other elongated articles.

Many methods have been proposed for butt welding railway rails to eliminate the complicated and expensive procedures and appliances now used in joining adjacent rails. To be acceptable in the field of welding steel rails, a method must consistently produce a welded rail which is not appreciably weaker than an unwelded rail. Although this requirement would seem to be obtainable in such a highly developed art as butt welding, these prior methods have not met with success because they could not consistently produce a welded joint that would not fail under the tremendous physical abuse which must be absorbed by a railway rail. Because none of the prior known methods of welding rails could consistently produce high quality welded joints, no method of welding railway rails has been universally adopted.

The present invention pertains to a method of butt welding adjacent railway rails which will consistently produce a welded joint that will withstand the tensile, bending and fatigue stresses to which such rails are subjected.

In accordance with the present invention, there is provided a method of butt welding the axially facing ends of two elongated workpieces, such as steel railway rails each having substantially identical cross sections which method comprises the following steps: trimming the axially facing ends of the rails to produce facing surfaces that are substantially perpendicular to the axes of the rails; abutting the surfaces at a joint while the surfaces are free from contaminants; supporting the rails against movement transverse to the axes of the rails at least in the area of the joint; coining the axially facing surfaces by applying an axial coining pressure; releasing the coining pressure, inductively heating the joint by a high frequency current until the joint reaches a temperature sufficient to produce grain growth across the abutting surfaces; maintaining an axial upsetting pressure on the joint in a range having a minimum of approximately 2500 p.s.i. and a maximum below the coining pressure while the joint is being heated; and applying a higher axial upsetting pressure on the workpiece until the desired upset has been obtained.

In accordance with another aspect of the present invention, there is provided a method of butt welding two sections of railway rails each having an identical cross section including a bearing head, a web and a pair of opposed flanges, the method comprising the following steps: axially abutting the sections at a joint; inductively heating the joint to an upsetting temperature; simultaneously applying an axial upsetting force on the joint; and restraining the opposed flanges from substantial outward deflection during the upsetting.

The primary object of the present invention is the provision of a method of butt welding elongated workpieces which method consistently produces a welded joint that can absorb high dynamic loading without failure.

Another object of the present invention is the provision of a method of butt welding railway rails which method consistently produces a welded joint that is satisfactory for use on a railway track.

Another object of the present invention is the provision of a method of butt welding railway rails which method consistently produces a welded joint that can withstand the dynamic stresses encountered during use of the rail.

Yet another object of the present invention is the provision of a method of butt welding elongated workpieces which method consistently produces a welded joint wherein there is grain growth across the joint over substantially the complete cross section of the workpieces.

Yet another object of the present invention is the provision of a method as defined above which method includes the step of coining the subsequently welded surfaces of the joint at a pressure of at least 7500 p.s.i. for at least 5 seconds while the surfaces are substantially free of contaminants.

Another object of the present invention is the provision of a method as defined above which method includes the step of inductive heating the joint while an axial pressure of at least 2500 p.s.i. is maintained on the joint.

Yet another object of the present invention is the provision of a method of butt welding railway rails as defined above which method includes the step of heating the subsequently welded ends of the rails to an upsetting temperature and then applying an upsetting pressure on said rails until the desired upset has been reached.

These and other objects and advantages will become apparent from the following description used to illustrate a preferred embodiment of the invention as read in connection with the accompanying drawings in which:

FIGURE 1 is a side elevational view illustrating an apparatus for butt welding the ends of railway rails in accordance with the present invention;

FIGURE 2 is a cross sectional view taken along line 2—2 of FIGURE 1;

FIGURE 3 is a cross sectional view taken generally along line 3—3 of FIGURE 1;

FIGURES 4A and 4B are somewhat schematic views illustrating a rail welded in accordance with prior methods;

FIGURE 4C is a somewhat schematic view illustrating a rail welded in accordance with the present invention.

Figure 5:
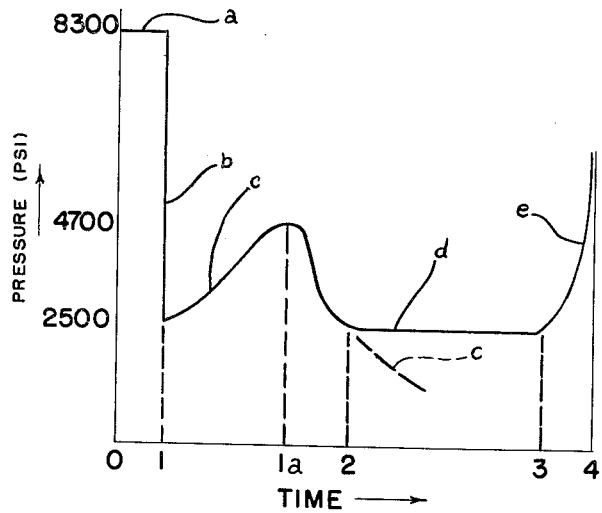
FIGURES 5–8 are somewhat schematic graphical illustrations of the operating steps utilized in the present invention.

Referring now to the drawing, wherein the showings are for the purpose of illustrating a preferred embodiment of the invention only and not for the purpose of limiting same, FIGURES 1–3 show rails 10, 12 of the type used in the construction of a railway track, which rails each have substantially identical cross sections including a bearing head 14, a web 16 and opposed flanges 18, 20. The present invention is directed toward a method for butt welding the axially facing ends of rails 10, 12 at joint X which method requires the axial alignment of rails 10, 12. Such alignment of the rails is accomplished by providing a pair of appropriate support fixtures 22, one for each rail. The support fixtures 22 are substantially identical in construction; therefore, only one support structure will be described in detail and it is realized that the description applies equally to the other fixture.

The support fixture functions to axially align the rails 10, 12 and further functions ot prevent transverse movement of the rails especially in the immediate vicinity of joint X. Accordingly, rails 10, 12 are movable relative to each other in only an axial direction. In order to accomplish the above-mentioned functions, fixture 22 could assume a variety of structural embodiments; however, in accordance with the preferred embodiment of the present invention, fixture 22 comprises a support base 24 onto which there is fastened, by appropriate means, a rail flange support 26 having spaced side supports 28, 30 as is best shown in FIGURE 2. Spaced above and substantially parallel to the flange support 26, fixture 22 is provided with a hold down cross bar 32 adjustably secured with respect to the support 26 by tie rods 34, 36 extending from the side supports 28, 30 respectively and received within the cross bar 32. A number of cross bars 32 may be spaced along the length of the rails 10, 12 to provide spaced supports for the rails. Rails 10 and 12 are positioned on the base support 24 so that the flanges 18, 20 are restrained from downward movement by support 26 and from transverse movement by side supports 28, 30 respectively. Tie rods 34, 36 are used to draw cross bars 32 downwardly against the bearing head portions 14 of the rails so that the rails can move a substantial amount only in an axial direction.

To allow creation of substantial pressures at the joint surfaces between the abutting end of rails 10, 12, in accordance with the preferred embodiment of the present invention, there is provided an abutment 40 adjacent one end of rail 12 and a ram 42 in pressure engaging contact with the opposite end of rail 10. Various means could be provided for applying force to ram 42; however, in accordance with the preferred embodiment of the present invention, ram 42 is operated by a controlled hydraulic cylinder and the ram moves generally along a path coaxially with rails 10, 12. As so far described, it is obvious that rails 10, 12 can be forced together by ram 42 and they will move only in an axial direction because of the transverse restraint imposed by support fixtures 22.

Surrounding the rails 10, 12 at the joint X, is an inductor 50 of the single turn type which has an appropriate contour to provide efficient magnetic coupling with the rails 10, 12. In accordance with the preferred embodiment of the present invention, the inductor 50 has a ¾" face extending axially along rails 10, 12 and a substantially ¾" coupling space between the inner face of the inductor and the outer surface of the rails before welding. In accordance with known practice, the single turn inductor 50 is connected by leads 52, 54 to an appropriate high frequency power source 56. Current flowing through leads 52, 54 and around inductor 50, induces a voltage within the abutting end of rails 10, 12 which induced voltage causes an appropriate current flow that heats the joint X. This procedure is well know in the induction heating art and further description thereof is unnecessary. To prevent uneven heating adjacent the opposed flanges 18, 20 there may be provided stacks of iron lamina 60, 62 which functions in accordance with know electrical principles to provide more even heating throughout the complete cross section of rails 10, 12.

An important feature of the present invention is the use of restraining blocks 64, 66 adjacent the abutting end of rails 10, 12 and under the opposed flanges 18, 20 as is best seen in FIGURES 1 and 3. In accordance with the preferred embodiment of the present invention, these blocks are produced from a non-magnetic material which does not substantially affect the operation of inductor 50. The blocks are positioned as close as possible to the joint X between the rails 10, 12 and it is preferred that the blocks be positioned directly under the joint between the rails. This is physically impossible in the preferred embodiment of the invention because the inductor 50 completely surrounds the rails and does not leave sufficient clearance for the restraining blocks directly under the joint.

The basic mechanical functions of the apparatus, as so far described, are as follows: fixtures 22 transversely restrain rails 10, 12; ram 42 acts against abutment 40 to create pressure at the joint X; inductor 50 heats the joint X; and restraining blocks 64, 66 prevent downward movement of the unsupported flanges 18, 20. These functions are utilized in accomplishing the novel method in accordance with the present invention which method will be hereinafter described in detail.

Figure 6:
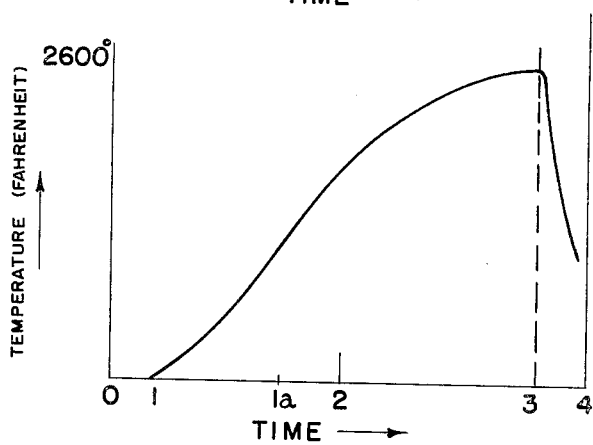
Figure 7:
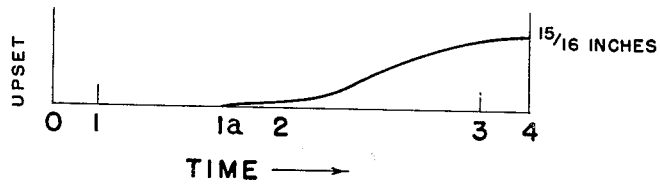
Figure 8:
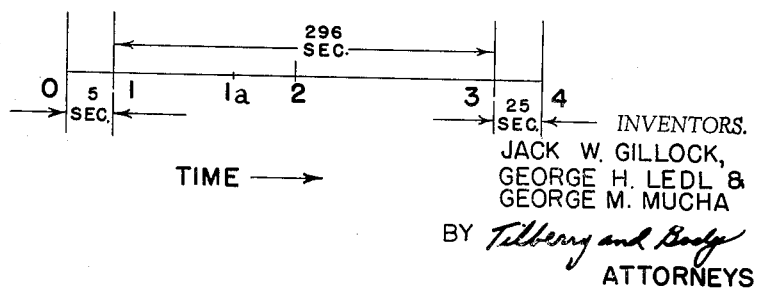

To appreciate more fully the characteristics of the method in accordance with the present invention, reference is made to the graphs shown in FIGURES 5–8. FIGURE 5 illustrates, somewhat theoretically, the relationship between time and the pressure being exerted on the joint X by the action of ram 42 against abutment 40. FIGURE 6 illustrates the temperature adjacent the abutting surfaces of the rails, FIGURE 7 illustrates the amount of physical upset at the joint; and FIGURE 8 illustrates the optimum time required in practicing the invention. The numbers along the abscissa of the graphs are used to correlate the graphs so that the pressure, temperature, and upset at a given time are easily discernible. Having thus described the chart shown in FIGURES 5–8, the method of butt welding the rails 10, 12 in accordance with the present invention will be hereinafter described in detail with reference to the graphs for explanatory purposes.

Before the rails 10, 12 are positioned in support fixtures 22, the ends that are to be abutted are sawed or otherwise machined to provide abutting surfaces that are substantially perpendicular to the axes of the rails. These abutting surfaces should have a finish of at least 250 microinches which finish can be obtained during the sawing or machining operation or may be provided by subsequent grinding or other secondary machining of the abutting surfaces. Any irregularities on the surfaces are removed before the rails are forced together. If the rails are placed together immediately after being machined, it is possible to abut the rail ends without a further cleaning operation; however, if a prolonged period has expired in excess of one hour, oxides may form on the machined surface and it is necessary to remove these oxides before the rails are actually brought together. Any appropriate method of removing the oxides, such as cleaning with carbontetrachloride, may be used.

Having the ends of the rails appropriately machined and substantially free from contaminants, such as oxides and greases, the rails are brought together and positioned within fixtures 22 so that they can move only axial with respect to each other. It is appreciated that there should be no long delay before the abutting ends are brought together because such a delay could result in oxidation of the previously cleaned surfaces.

After the rails are supported within fixtures 22, the abutting surfaces are substantially centered with respect to the inductor 50 as is shown in FIGURE 1 and the ram 42 is brought into engagement with rail 10 to force this rail against rail 12 that is supported by abutment 40. At once, the ram 42 applies enough pressure to the end of rail 10 to force the abutting surfaces in close contact with each other.

After the ram 42 is in position, the restraining blocks 64, 66 are adjusted below flanges 18, 20 so that the downward movement of these flanges is restrained in a manner to be hereinafter described in detail.

Referring to the graph in FIGURES 5–8, the pressure on the ram 42, the temperature of the joint between the rails, and the upset at the joint are at position 0 wherein the pressure on the ram is negligible, only sufficient to hold the rails together, the temperature is substantially room temperature, and there is no upset. At this stage in the method of butt welding, a pressure at least greater than 7500 p.s.i., preferably 8300 p.s.i., is exerted by the ram 42 against the abutment 40. And this pressure is held for at least 5 seconds as illustrated by curve $a$ in FIGURE 5. This high pressure causes the abutting faces of rails 10, 12 to be coined together which excludes all oxidizing gases from between the rails and provides accurate matching of the abutting surfaces. The 5 seconds required for this coining operation can be extended to provide a better coining without departing from the intended spirit and scope of the invention. At the end of the coining step, i.e., at position 1, the pressure on the ram 42 is abruptly reduced to approximately 2500 p.s.i. as represented by curve b.

Beyond position 1, the ram is so controlled that it will always exert at least approximately 2500 p.s.i. on the rail 10. Further, the ram 42 will not yield in a direction away from the joint between the rails. Accordingly, it is possible to exert a greater pressure than approximately 2500 p.s.i. on the rail 10; however, no lesser pressure can be exerted by the ram. The ram is so controlled in this manner during the complete heating cycle which will be hereinafter described in detail.

With ram 42 controlled so that it cannot move away from the joint and will exert always at least 2500 p.s.i. on the rail, the inductor 50 is energized by the power source 56. The induced voltage within the abutting ends of the rails causes a corresponding current flow which increases the temperature of the abutting edges. This is shown in FIGURE 6 between positions 1 and 3. Because of the particular control exerted on the ram 42, the pressure between ram 42 and rail 10 will increase because the rails will expand during the initial heating cycle and the ram 42 cannot be moved away from the joint in the rail to accommodate this expansion. The increase in pressure exerted by the ram is represented by curve c in FIGURE 5. It is noted that the pressure increases to position 1a at which time the pressure gradually decreases. This decrease in pressure is caused by the slight upset occurring at the joint between the rails. This upset is shown in FIGURE 7 commencing at position 1a. As the upset increases, the pressure exerted by ram 42 continues to decrease and would follow the dashed line curve c as shown in FIGURE 5 were it not for the second control on ram 42 that will not allow the ram to exert a pressure less than 2500 p.s.i. on the rail 10. Accordingly, at position 2, where the curve c starts to decrease below 2500 p.s.i., the ram is again actuated to maintain a constant pressure of 2500 p.s.i. on the rail. This constant pressure line is indicated as curve d in FIGURE 5. Since the temperature is increasing as is shown in FIGURE 6 between positions 2 and 3 and the pressure is maintained substantially constant, the rails 10, 12 are upset a substantial amount as is shown in FIGURE 7. When the temperature at the joint between the rails reaches approximately 2500–2600° F., the heating cycle is stopped. At this temperature, it has been found that there is grain growth between the abutting edges of the rails. Thus, the rails are substantially integral across joint X.

It has been found that a certain amount of upset is required between rails 10, 12 to provide the desired physical characteristics at the joint X. Accordingly, after the heating cycle has been shut off, the pressure on ram 42 is rapidly increased to a higher upsetting pressure as is shown in curve e of FIGURE 5. This final, rapid increase in the upsetting pressure on ram 42 continues between positions 3 and 4 until the proper upset of joint X is obtained. Because the temperature on the joint is decreasing between positions 3 and 4, the desired upset must be accomplished in a rather short time. In accordance with the invention, the build up of pressure represented by curve e, approaches a high value having a maximum in the range of 6900 p.s.i.

In accordance with the preferred embodiment of the invention, the heating cycle is on for 296 seconds and the final upset step requires approximately 25 seconds as is shown in FIGURE 8.

After the desired upset has been reached, the pressure on ram 42 is released and the joint is allowed to cool at room temperature.

To increase the ductility of the joint, an induction heating coil approximately 5" wide may be connected to a power source of 30 kilowatts to heat the joint X to a temperature just above the critical temperature and then the joint allowed to cool so that the joint may be normalized as is well known in the metallurgical art. This normalizing step may be commenced when the rail has cooled to approximately 800° F. or any other commonly used temperatures.

In accordance with the invention, the power source has a peak of 120 kilowatts at a frequency of 3 kc. It is within the contemplation of the invention to somewhat reduce the kilowatt input at the joint as the temperature of the metal increases. Accordingly, at the end of the heating cycle, i.e., position 3, the power from the source 56 may be approximately 85–90 kilowatts.

In the prior methods of butt welding rails 10, 12, the opposed flanges 18, 20 tended to buckle outwardly and downwardly as is shown in FIGURES 4A, 4B respectively. The outermost ends of these flanges would not have a substantial amount of force axial thereon after the buckling started; therefore, a fault 70 was usually created and was basically an unwelded crevice at the outer end of the flanges. In these figures, the fault is exaggerated for explanatory purposes. The fault 70 lies between surfaces 72, 74 of the opposed flanges so that it is impossible to grind along these surfaces and remove the fault. Accordingly, prior methods often resulted in a joint having slight unwelded portions adjacent the outermost ends of the opposed flanges. During fatigue stressing, stresses were concentrated at these unwelded portions and the rail quickly failed.

In accordance with an aspect of the present invention, a number of restraining blocks, which are represented by block 64 in FIGURE 4C, are positioned directly below the opposed flanges 18, 20 so that the downward movement of the flanges is substantially eliminated. It has been found that by this relatively simple means, the fault 70 may be eliminated or it is created above surface 72 or below surface 74. In this manner, the surfaces may be ground flat and the fault removed. Without this stress concentrating fault at the upset joint between rails 10, 12, the physical characteristics of the joint are substantially improved. This fault 70, of course, did not appear in all of the previous methods for butt welding rails but only in the methods which upset the joint between adjacent rails which is an important aspect of the present invention.

By utilizing the above-described method of welding, a 127 pound rail can be joined with a similar rail by a welded joint found to have fine ferro-pearlitic structures spanning the interfaces of the joint wherein substantially no oxygen or oxides were present. It appeared that any minute amounts of oxides that may have been present were broken up and dispersed by the great amount of upset at the welded joint.

The welded rails were subjected to a variety of physical tests. Tensile specimens prepared through various cross sections all developed tensile strength within 10,000 pounds of that of the parent metal. Bending fatigue tests made on the welded rails withstood 2,000,000 cycles without failure which is well in excess of the minimum required cycles and exceeds that which could be produced by any other known method of welding railway rails. The bending tests and drop tests of the welded joint greatly exceeded other known methods of welding rails. Accordingly, applicant's invention is a substantial improvement over known methods of butt welding adjacent sections of railway rails.

The present invention has been discussed in connection with a preferred embodiment thereof; however, it should be appreciated that the invention is not to be limited by the structural details used herein for illustrative purposes or the various operations used in the preferred embodiment of the invention. Various changes in the preferred embodiment and the structural features

Having thus described our invention, we claim:

1. A method of butt welding the axially facing ends of two elongated workpieces having substantially identical cross sections, comprising the following steps: trimming the axially facing ends of said workpieces to produce surfaces that are substantially perpendicular to the axes of said workpieces; abutting said surfaces at a joint with said workpieces axially aligned while said surfaces are substantially free from contaminants; supporting said workpieces against movement transverse to the axes of said workpieces at least in the immediate area of said joint; coining said axially facing surfaces by applying an axial coining pressure; releasing said coining pressure; inductively heating said joint by a high frequency current until said joint reaches a temperature sufficient to produce grain growth across said abutting surfaces; maintaining an axial upsetting pressure on said joint in a range having a minimum of approximately 2500 p.s.i. and a maximum below said coining pressure while said joint is being heated; and thereafter applying a higher axial upsetting pressure on said workpieces until the desired upset has been obtained.

2. The method as defined in claim 1 wherein said coining pressure is at least 7500 p.s.i.

3. The method as defined in claim 1 wherein said joint is inductively heated to a temperature of at least 2500° F.

4. The method as defined in claim 1 including the further step of cleaning said surfaces before abutting said surfaces at said joint.

5. The method as defined in claim 1 wherein said surfaces are abutted less than one hour after said ends are trimmed.

6. The method as defined in claim 1 including the further step of limiting the higher axial upsetting pressure to 6900 p.s.i.

7. The method as defined in claim 1 including the further step of machining said facing surfaces to a finish of 250 micro inches or less.

8. A method of butt welding the axially facing ends of two elongated ferrous workpieces having substantially identical cross sections, comprising the following steps: trimming the axially facing ends of the workpieces to produce facing surfaces that are substantially perpendicular to the axes of said workpieces; removing contaminants from said surfaces; abutting said surfaces at a joint with said workpieces axially aligned while said surfaces are substantially free from contaminants; supporting said workpieces from movement transverse to the axes of said workpieces at least in the immediate area of said joint; coining said axially facing surfaces by an axial pressure of at least 7500 p.s.i. for at least 5 seconds; reducing the axial pressure on said workpieces to approximately 2500 p.s.i.; restraining axial movement of said workpieces in a direction away from said joint; inductively heating said joint with a high frequency current until said joint reaches a temperature of at least 2500° F.; maintaining a minimum axial upsetting pressure on said joint of approximately 2500 p.s.i. while said workpieces are being heated; rapidly increasing said axial upsetting pressure on said workpieces after heating has been completed; and releasing said increased axial upsetting pressure when said workpieces have been upset to the desired extent.

9. A method of butt welding two sections of railway rails each having an identical cross section including a bearing head, a web and a pair of opposed flanges, said method comprising the following steps: axially abutting said sections at a joint; inductively heating said joint to an upsetting temperature; simultaneously applying an axial upsetting force on said joint; and restraining said opposed flanges from substantial outward deflection during said upsetting.

10. The method as defined in claim 9 including the step of coining said sections together with a pressure of at least 7500 p.s.i. before heating said sections.

References Cited by the Examiner

UNITED STATES PATENTS

| | | | |
|---|---|---|---|
| 2,299,543 | 10/42 | Humphrey | 219—80 |
| 2,862,092 | 11/58 | Cowan | 219—9.5 |
| 2,892,914 | 6/59 | Rudd | 219—9.5 |
| 2,912,550 | 11/59 | Harris | 219—9.5 |

RICHARD M. WOOD, *Primary Examiner.*